(12) United States Patent
Hasegawa et al.

(10) Patent No.: US 12,503,155 B2
(45) Date of Patent: Dec. 23, 2025

(54) VEHICLE CONTROL DEVICE

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Kazuma Hasegawa, Anjo (JP); Yuji Fujita, Okazaki (JP); Yuuta Kajisawa, Okazaki (JP); Yugo Nagashima, Anjo (JP); Takashi Koudai, Okazaki (JP); Masaharu Yamashita, Toyota (JP); Atsushi Satou, Miyoshi (JP); Yosuke Yamashita, Nagoya (JP); Kazuaki Iida, Toyota (JP); Hiroyuki Katayama, Toyota (JP); Shintaro Takayama, Toyota (JP); Toyohiro Hayashi, Kariya (JP); Hiroki Tomizawa, Kariya (JP); Nobuyori Nakajima, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 436 days.

(21) Appl. No.: 18/142,407

(22) Filed: May 2, 2023

(65) Prior Publication Data

US 2023/0365187 A1 Nov. 16, 2023

(30) Foreign Application Priority Data

May 10, 2022 (JP) ................................ 2022-077401

(51) Int. Cl.
B62D 5/04 (2006.01)

(52) U.S. Cl.
CPC ......... B62D 5/0484 (2013.01); B62D 5/0463 (2013.01); B62D 5/049 (2013.01)

(58) Field of Classification Search
CPC .. B62D 5/0463; B62D 5/0481; B62D 5/0484; B62D 5/049
See application file for complete search history.

(56) References Cited

U.S. PATENT DOCUMENTS

2015/0175191 A1 6/2015 Harada et al.
2019/0367093 A1* 12/2019 Suzuki ................... G01D 5/145
(Continued)

FOREIGN PATENT DOCUMENTS

JP 2015-116964 A 6/2015

OTHER PUBLICATIONS

Oct. 12, 2023 Search Report issued in European Patent Application No. 23171240.7.

*Primary Examiner* — William C Joyce
(74) *Attorney, Agent, or Firm* — Oliff PLC

(57) ABSTRACT

A vehicle control device includes: dual-system control circuits that control power supply to dual-system winding sets of a motor; and dual-system rotation detection circuits. The control circuits calculate an absolute rotation angle of the motor, and, when a power source is turned off, store an absolute rotation angle of the motor at that time. The control circuits start when the power source is turned on and the absolute value of a difference between an absolute rotation angle that was stored when the power source was turned off last time and an absolute rotation angle that is calculated when the power source is turned on this time is equal to or smaller than a given threshold value, regardless of whether an abnormality has occurred in one of the dual-system rotation detection circuits or an abnormality of the dual-system rotation detection circuits is not determinable.

7 Claims, 5 Drawing Sheets

(56) References Cited

U.S. PATENT DOCUMENTS

| | | |
|---|---|---|
| 2019/0368901 A1 | 12/2019 | Fujita et al. |
| 2020/0180685 A1* | 6/2020 | Suzuki ................. B62D 5/0412 |
| 2023/0001983 A1* | 1/2023 | Yamashita ............. B62D 6/008 |
| 2023/0126878 A1* | 4/2023 | Koudai ................. B60W 50/14 |
| | | 701/41 |

* cited by examiner

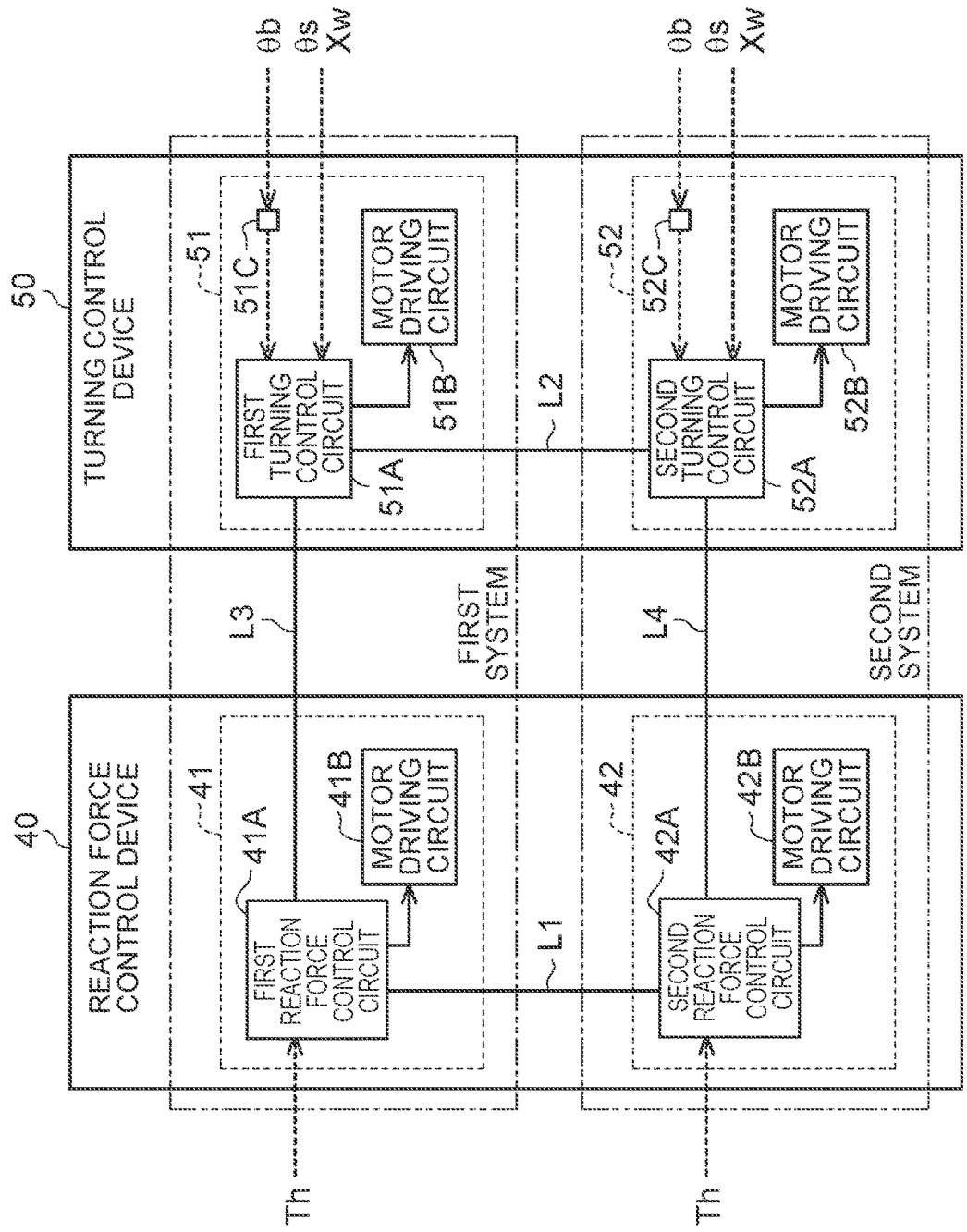

FIG. 3

| C1 INTER-MICROCOMPUTER COMMUNICATION | C2 DRIVING STATE MAIN | C2 DRIVING STATE SUB | C3 BATTERY RESET MAIN | C3 BATTERY RESET SUB | C4 TC INITIAL STATE FLAG MAIN | C4 TC INITIAL STATE FLAG SUB | C5 IMPLEMENTATION OR NO IMPLEMENTATION OF TC COMPARISON | C6 TC INITIAL STATE DETERMINATION RESULT MAIN | C6 TC INITIAL STATE DETERMINATION RESULT SUB |
|---|---|---|---|---|---|---|---|---|---|
| NORMAL | COLLABORATIVE OR INDEPENDENT | COLLABORATIVE OR INDEPENDENT | — | — | NORMAL | NORMAL | IMPLEMENTATION | CONTINUOUS | CONTINUOUS |
| NORMAL | COLLABORATIVE OR INDEPENDENT | COLLABORATIVE OR INDEPENDENT | RESET | — | INVALID | NORMAL | IMPLEMENTATION | NOT CONTINUOUS | CONTINUOUS |
| NORMAL | COLLABORATIVE OR INDEPENDENT | COLLABORATIVE OR INDEPENDENT | — | RESET | NORMAL | INVALID | IMPLEMENTATION | CONTINUOUS | NOT CONTINUOUS |
| NORMAL | COLLABORATIVE OR INDEPENDENT | COLLABORATIVE OR INDEPENDENT | RESET | RESET | INVALID | INVALID | IMPLEMENTATION | NOT CONTINUOUS | NOT CONTINUOUS |
| NORMAL | COLLABORATIVE OR INDEPENDENT | SHUTDOWN (NON-ROTATION-ANGLE-RELATED FAILURE, CONFIRMED AFTER ABSOLUTE ANGLE IS CALCULATED) | — | — | NORMAL | INVALID | IMPLEMENTATION | CONTINUOUS | CONTINUOUS |
| NORMAL | COLLABORATIVE OR INDEPENDENT | SHUTDOWN (NON-ROTATION-ANGLE-RELATED FAILURE, CONFIRMED AFTER ABSOLUTE ANGLE IS CALCULATED) | RESET | — | INVALID | INVALID | IMPLEMENTATION | NOT CONTINUOUS | CONTINUOUS |
| NORMAL | COLLABORATIVE OR INDEPENDENT | SHUTDOWN (NON-ROTATION-ANGLE-RELATED FAILURE, CONFIRMED AFTER ABSOLUTE ANGLE IS CALCULATED) | — | RESET | NORMAL | INVALID | IMPLEMENTATION | CONTINUOUS | NOT CONTINUOUS |
| NORMAL | COLLABORATIVE OR INDEPENDENT | SHUTDOWN (NON-ROTATION-ANGLE-RELATED FAILURE, CONFIRMED AFTER ABSOLUTE ANGLE IS CALCULATED) | RESET | RESET | INVALID | INVALID | IMPLEMENTATION | NOT CONTINUOUS | NOT CONTINUOUS |
| NORMAL | COLLABORATIVE OR INDEPENDENT | SHUTDOWN (NON-ROTATION-ANGLE-RELATED FAILURE, CONFIRMED BEFORE ABSOLUTE ANGLE IS CALCULATED) | — | — | INVALID | INVALID | IMPLEMENTATION | NOT CONTINUOUS | NOT CONTINUOUS |
| NORMAL | COLLABORATIVE OR INDEPENDENT | SHUTDOWN (NON-ROTATION-ANGLE-RELATED FAILURE, CONFIRMED BEFORE ABSOLUTE ANGLE IS CALCULATED) | RESET | — | INVALID | INVALID | IMPLEMENTATION | NOT CONTINUOUS | NOT CONTINUOUS |
| NORMAL | COLLABORATIVE OR INDEPENDENT | SHUTDOWN (NON-ROTATION-ANGLE-RELATED FAILURE, CONFIRMED BEFORE ABSOLUTE ANGLE IS CALCULATED) | — | RESET | INVALID | INVALID | IMPLEMENTATION | NOT CONTINUOUS | NOT CONTINUOUS |
| NORMAL | COLLABORATIVE OR INDEPENDENT | SHUTDOWN (NON-ROTATION-ANGLE-RELATED FAILURE, CONFIRMED BEFORE ABSOLUTE ANGLE IS CALCULATED) | RESET | RESET | INVALID | INVALID | IMPLEMENTATION | NOT CONTINUOUS | NOT CONTINUOUS |
| NORMAL | COLLABORATIVE OR INDEPENDENT | SHUTDOWN (ROTATION-ANGLE-RELATED FAILURE) | — | — | INVALID | INVALID | NO IMPLEMENTATION | NOT CONTINUOUS | — |
| NORMAL | COLLABORATIVE OR INDEPENDENT | SHUTDOWN (ROTATION-ANGLE-RELATED FAILURE) | RESET | — | INVALID | INVALID | NO IMPLEMENTATION | NOT CONTINUOUS | — |
| NORMAL | COLLABORATIVE OR INDEPENDENT | SHUTDOWN (ROTATION-ANGLE-RELATED FAILURE) | — | RESET | INVALID | INVALID | NO IMPLEMENTATION | NOT CONTINUOUS | — |
| NORMAL | COLLABORATIVE OR INDEPENDENT | SHUTDOWN (ROTATION-ANGLE-RELATED FAILURE) | RESET | RESET | INVALID | INVALID | NO IMPLEMENTATION | NOT CONTINUOUS | — |
| NORMAL | SINGLE SYSTEM | SHUTDOWN | — | — | INVALID | — | NO IMPLEMENTATION | NOT CONTINUOUS | — |
| NORMAL | SINGLE SYSTEM | SHUTDOWN | RESET | — | INVALID | — | NO IMPLEMENTATION | NOT CONTINUOUS | — |
| NORMAL | SHUTDOWN | SINGLE SYSTEM | — | — | — | INVALID | NO IMPLEMENTATION | — | NOT CONTINUOUS |
| NORMAL | SHUTDOWN | SINGLE SYSTEM | — | RESET | — | INVALID | NO IMPLEMENTATION | — | NOT CONTINUOUS |
| ABNORMAL | INDEPENDENT | INDEPENDENT | — | — | INVALID | INVALID | IMPLEMENTATION | CONTINUOUS | CONTINUOUS |
| ABNORMAL | INDEPENDENT | INDEPENDENT | RESET | — | INVALID | INVALID | IMPLEMENTATION | NOT CONTINUOUS | CONTINUOUS |
| ABNORMAL | INDEPENDENT | INDEPENDENT | — | RESET | INVALID | INVALID | IMPLEMENTATION | CONTINUOUS | NOT CONTINUOUS |
| ABNORMAL | INDEPENDENT | INDEPENDENT | RESET | RESET | INVALID | INVALID | IMPLEMENTATION | NOT CONTINUOUS | NOT CONTINUOUS |
| ABNORMAL | INDEPENDENT | SHUTDOWN | — | — | INVALID | — | NO IMPLEMENTATION | NOT CONTINUOUS | — |
| ABNORMAL | INDEPENDENT | SHUTDOWN | RESET | — | INVALID | — | NO IMPLEMENTATION | NOT CONTINUOUS | — |
| ABNORMAL | SHUTDOWN | INDEPENDENT | — | — | — | INVALID | NO IMPLEMENTATION | — | NOT CONTINUOUS |
| ABNORMAL | SHUTDOWN | INDEPENDENT | — | RESET | — | INVALID | NO IMPLEMENTATION | — | NOT CONTINUOUS |
| — | SINGLE SYSTEM | SHUTDOWN | — | — | INVALID | — | NO IMPLEMENTATION | NOT CONTINUOUS | — |
| — | SINGLE SYSTEM | SHUTDOWN | RESET | — | INVALID | — | NO IMPLEMENTATION | NOT CONTINUOUS | — |
| — | SHUTDOWN | SINGLE SYSTEM | — | — | — | INVALID | NO IMPLEMENTATION | — | NOT CONTINUOUS |
| — | SHUTDOWN | SINGLE SYSTEM | — | RESET | — | INVALID | NO IMPLEMENTATION | — | NOT CONTINUOUS |

→ REGARDED AS "NORMAL"

VEHICLE CONTROL DEVICE

CROSS-REFERENCE TO RELATED APPLICATION

This application claims priority to Japanese Patent Application No. 2022-077401 filed on May 10, 2022, incorporated herein by reference in its entirety.

BACKGROUND

1. Technical Field

The present disclosure relates to a vehicle control device.

2. Description of Related Art

There are conventionally known vehicle control devices like this one: The electronic control unit (ECU) of Japanese Unexamined Patent Application Publication No. 2015-116964 (JP 2015-116964 A), for example, controls a motor of an electric power steering system installed in a vehicle. The ECU has dual-system magnetic detection elements. The ECU generates motor rotation angle information from a first rotation angle signal generated by a magnetic detection element of a first system and a second rotation angle signal generated by a magnetic detection element of a second system. The ECU calculates the position of a steering wheel from the motor rotation angle information.

The ECU compares first motor rotation angle information obtained from the first rotation angle signal and second motor rotation angle information obtained from the second rotation angle signal. When the first motor rotation angle information and the second motor rotation angle information match, the ECU executes assistive control of assisting the steering of the steering wheel using information on the position of the steering wheel obtained from the motor rotation angle information. When the first motor rotation angle information and the second motor rotation angle information do not match, the ECU detects an abnormality of the magnetic detection element of the first system or the magnetic detection element of the second system.

SUMMARY

The ECU of JP 2015-116964 A can detect that one of the dual-system magnetic detection elements is abnormal. However, the ECU of JP 2015-116964 A cannot identify which of the dual-system magnetic detection elements is abnormal. Thus, driving of the motor may fail to start even when one of the dual-system magnetic detection elements is normal.

A vehicle control device according to one aspect of the present disclosure includes: dual-system control circuits that control power supply to dual-system winding sets of a motor having the winding sets, for each system independently; and dual-system rotation detection circuits each of which detects a rotation speed of the motor. The control circuits are each configured to calculate an absolute rotation angle of the motor using the rotation speed of the motor, and each of the control circuits is configured to, when a power source is turned off, store an absolute rotation angle of the motor at that time and, when the power source is turned on, start after confirming that both of the dual-system rotation detection circuits are normal. At least one of the control circuits is configured to start when the power source is turned on and an absolute value of a difference between an absolute rotation angle of the motor that was stored when the power source was turned off last time and an absolute rotation angle of the motor that is calculated when the power source is turned on this time is equal to or smaller than a given threshold value, regardless of whether it is detected that an abnormality has occurred in one of the dual-system rotation detection circuits or an abnormality of the dual-system rotation detection circuits is not determinable.

According to this configuration, when the absolute value of the difference between the absolute rotation angle of the motor that was stored when the power source was turned off and the absolute rotation angle of the motor that is calculated when the power source is turned on next time is equal to or smaller than the given threshold value, the rotation detection circuit of the corresponding system can be said to be normal. Therefore, the control system of the first system or the second system can start appropriately to start executing motor control.

In the vehicle control device according to the above-described aspect, the dual-system control circuits may be a control circuit of a first system and a control circuit of a second system, and the dual-system rotation detection circuits may be a rotation detection circuit of the first system and a rotation detection circuit of the second system. The control circuit of the first system may be configured to provide, to the control circuit of the second system, the rotation speed of the motor detected by the rotation detection circuit of the first system, and receive the rotation speed of the motor detected by the rotation detection circuit of the second system. The control circuit of the second system may be configured to provide, to the control circuit of the first system, the rotation speed of the motor detected by the rotation detection circuit of the second system, and receive the rotation speed of the motor detected by the rotation detection circuit of the first system. The dual-system control circuits may be configured to determine an abnormality of the dual-system rotation detection circuits by comparing the rotation speeds of the motor detected by the dual-system rotation detection circuits. The dual-system control circuits may have a master-slave relationship, with the control circuit of the first system being a master and the control circuit of the second system being a slave, and a case where an abnormality of the dual-system rotation detection circuits is not determinable may be a case where the control circuit of the first system does not start when the power source is turned on.

According to this configuration, even in the case where the control circuit of the first system that is the master does not start when the power source is turned on, the rotation detection circuit of the second system can be said to be normal when the absolute value of the difference between the absolute rotation angle of the motor that was stored when the power source was turned off last time and the absolute rotation angle of the motor that is calculated when the power source is turned on this time is equal to or smaller than the given threshold value. Therefore, the control circuit of the second system that is the slave can start alone.

In the vehicle control device according to the above-described aspect, the motor may be a driving source of a mechanical device, and the mechanical device may have a sensor that detects an absolute position of a constituent element that operates in conjunction with the motor. Only the control circuit of the first system may be connected to the sensor. The control circuit of the first system may be configured to, when the power source is turned on and it is detected that an abnormality has occurred in one of the dual-system rotation detection circuits or an abnormality of the dual-system rotation detection circuits is not determinable, execute a process of calculating the absolute rotation angle of the motor using the absolute position of the constituent element detected through the sensor, and a process of transmitting the absolute position of the constituent element detected through the sensor to the control circuit of the second system.

According to this configuration, when the power source is turned on and an abnormality of one of the dual-system rotation detection circuits is detected or an abnormality of the dual-system rotation detection circuits is not determinable, the control circuit of the first system and the control circuit of the second system can calculate the absolute rotation angle of the motor using the absolute position of the constituent element of the mechanical device.

In the vehicle control device according to the above-described aspect, the mechanical device may be a steering system of a vehicle. The constituent element may be a turning shaft that turns a turning wheel of the vehicle. The sensor may be a stroke sensor that detects an absolute position of the turning shaft in an axial direction.

According to this configuration, when the power source is turned on and an abnormality of one of the dual-system rotation detection circuits is detected or an abnormality of the dual-system rotation detection circuits is not determinable, the control circuit of the first system and the control circuit of the second system can calculate the absolute rotation angle of the motor using the absolute position of the turning shaft that is a constituent element of the steering system.

In the vehicle control device according to the above-described aspect, the motor may be a turning-side motor that generates a turning force for turning the turning wheel of the vehicle. The dual-system control circuits may include a first turning control circuit that controls power supply to a winding set of a first system of the turning-side motor and a second turning control circuit that controls power supply to a winding set of a second system of the turning-side motor, and the winding set of the first system and the winding set of the second system may be provided as a dual-system winding sets.

As in this configuration, the turning-side motor is sometimes required to start as far as possible, even with a single system. Such requirement can be met.

In the vehicle control device according to the above-described aspect, the motor may be an assist motor that generates an assistive force for assisting operation of a steering wheel. The dual-system control circuits may include a first assistance control circuit that controls power supply to a winding set of a first system of the assist motor and a second assistance control circuit that controls power supply to a winding set of a second system of the assistance motor, and the winding set of the first system and the winding set of the second system may be provided as the dual-system winding sets.

As in this configuration, the assist motor is sometimes required to start as far as possible, even with a single system. Such requirement can be met.

The vehicle control device of the present disclosure can start more appropriately when the power source is turned on.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a block diagram of a reaction force control device and a turning control device of the first embodiment;

FIG. 3 is a table showing an example of states of each control circuit;

FIG. 5 is a flowchart showing a processing procedure of the second turning control circuit when the vehicle power source is turned on;

DETAILED DESCRIPTION OF EMBODIMENTS

First Embodiment

A first embodiment in which a vehicle control device is embodied in a steer-by-wire steering system will be described below. The steering system is a mechanical device.

Figure 1:
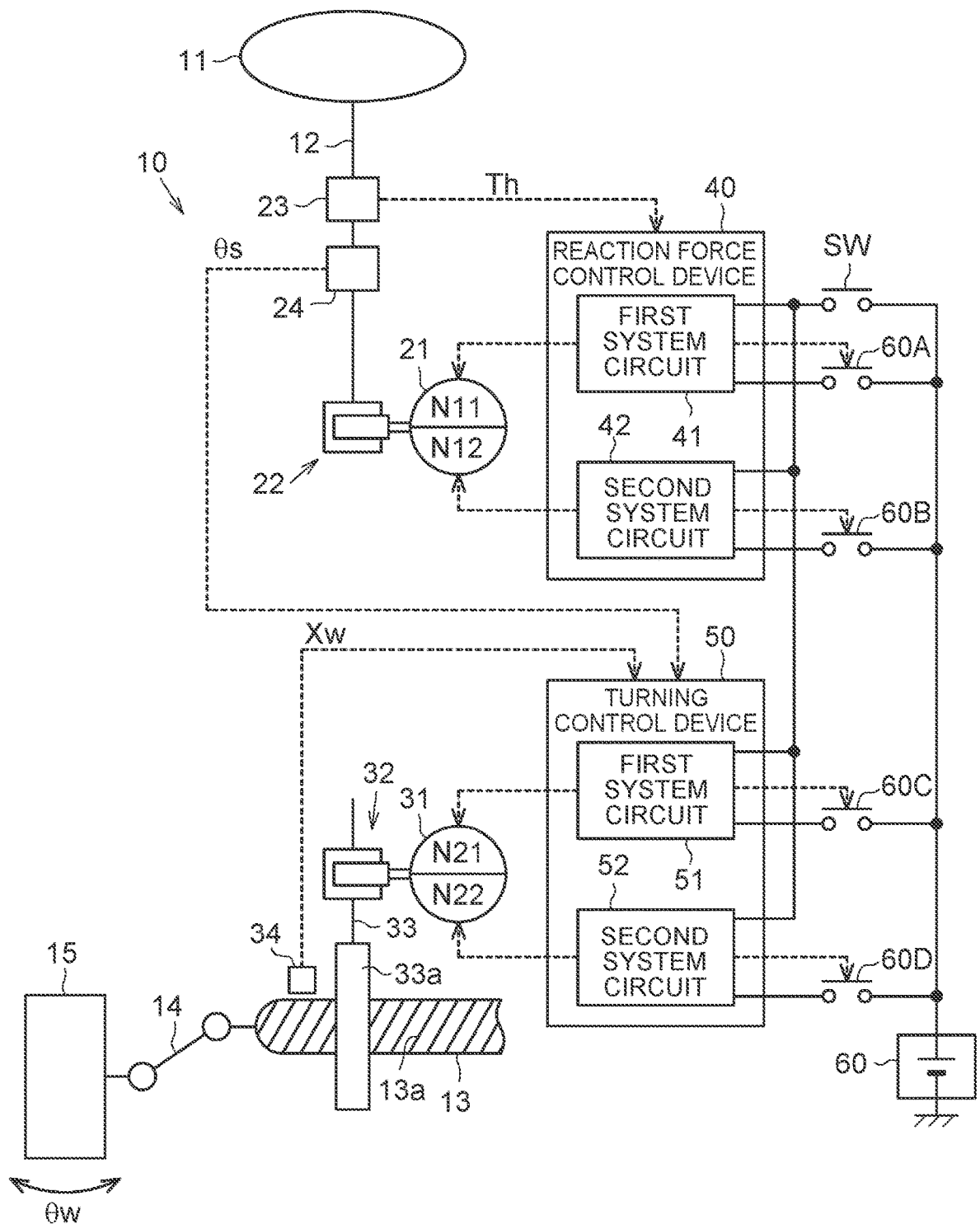
FIG. 1 is a configuration diagram of a steer-by-wire steering system equipped with a first embodiment of a vehicle control device.

As shown in FIG. 1, a steering system 10 of the vehicle has a steering shaft 12 coupled to a steering wheel 11. The steering system 10 further has a turning shaft 13 extending along a vehicle width direction (the left-right direction in FIG. 1). Turning wheels 15 are coupled to the ends of the turning shaft 13 through tie rods 14. As the turning shaft 13 moves linearly, a turning angle θw of the turning wheels 15 changes. The steering shaft 12 and the turning shaft 13 constitute a steering mechanism of the vehicle. In FIG. 1, only the turning wheel 15 on one side is shown.

The steering system 10 has a reaction force motor 21 and a speed reduction mechanism 22. The reaction force motor 21 is a generation source of a steering reaction force. A steering reaction force refers to a force that acts in the opposite direction from a direction in which the steering wheel 11 is operated by a driver. A rotating shaft of the reaction force motor 21 is coupled to the steering shaft 12 through the speed reduction mechanism 22. A torque of the reaction force motor 21 is applied to the steering shaft 12 as a steering reaction force. Applying the steering reaction force to the steering wheel 11 can give the driver an appropriate sense of resistance.

The reaction force motor 21 is, for example, a three-phase brushless motor. The reaction force motor 21 has a winding set N11 of a first system and a winding set N12 of a second system. The winding set N11 of the first system and the winding set N12 of the second system are wound around a common stator (not shown). The winding set N11 of the first system and the winding set N12 of the second system are equivalent to each other in electrical characteristics.

The steering system 10 has a turning-side motor 31 and a speed reduction mechanism 32. The turning-side motor 31 is a generation source of a turning force. A turning force refers to a motive force for turning the turning wheels 15. A rotating shaft of the turning-side motor 31 is coupled to a pinion shaft 33 through the speed reduction mechanism 32. Pinion teeth 33a of the pinion shaft 33 are meshed with rack teeth 13a of the turning shaft 13. A torque of the turning-side motor 31 is applied to the turning shaft 13 through the pinion shaft 33 as a turning force. The turning shaft 13 moves along the vehicle width direction according to rotation of the turning-side motor 31.

The turning-side motor 31 is, for example, a three-phase brushless motor. The turning-side motor 31 has a winding set N21 of a first system and a winding set N22 of a second system. The winding set N21 of the first system and the winding set N22 of the second system are wound around a common stator (not shown). The winding set N21 of the first system and the winding set N22 of the second system are equivalent to each other in electrical characteristics.

The steering system 10 has a reaction force control device 40. The reaction force control device 40 controls driving of the reaction force motor 21 that is a control target. The reaction force control device 40 executes reaction force control of generating a steering reaction force according to a steering torque Th in the reaction force motor 21. The reaction force control device 40 calculates a target steering reaction force based on the steering torque Th detected through a torque sensor 23. The torque sensor 23 is provided on the steering shaft 12. The reaction force control device 40 controls power supply to the reaction force motor 21 such that the actual steering reaction force applied to the steering shaft 12 matches the target steering reaction force. The reaction force control device 40 controls power supply to the dual-system winding sets in the reaction force motor 21, for each system independently.

The reaction force control device 40 has a first system circuit 41 and a second system circuit 42. The first system circuit 41 controls power supply to the winding set N11 of the first system in the reaction force motor 21 according to the steering torque Th detected through the torque sensor 23. The second system circuit 42 controls power supply to the winding set N12 of the second system in the reaction force motor 21 according to the steering torque Th detected through the torque sensor 23.

The steering system 10 has a turning control device 50. The turning control device 50 controls driving of the turning-side motor 31 that is a control target. The turning control device 50 executes turning control of generating, in the turning-side motor 31, a turning force for turning the turning wheels 15 according to a steering state. The turning control device 50 takes in a steering angle θs detected through a steering angle sensor 24 and a stroke Xw of the turning shaft 13 detected through a stroke sensor 34. The stroke Xw is a shift amount with reference to a neutral position of the turning shaft 13 and is a state variable reflecting the turning angle θw. The steering angle sensor 24 is provided between the torque sensor 23 of the steering shaft 12 and the speed reduction mechanism 22. The stroke sensor 34 is provided near the turning shaft 13.

The turning control device 50 calculates a target turning angle of the turning wheels 15 based on the steering angle θs detected through the steering angle sensor 24. The turning control device 50 calculates the turning angle θw based on the stroke Xw of the turning shaft 13 detected through the stroke sensor 34. The turning control device 50 controls power supply to the turning-side motor 31 such that the turning angle θw calculated based on the stroke Xw matches the target turning angle. The turning control device 50 controls power supply to the dual-system winding sets in the turning-side motor 31, for each system independently.

The turning control device 50 has a first system circuit 51 and a second system circuit 52. The first system circuit 51 controls power supply to the winding set N21 of the first system in the turning-side motor 31 based on the steering angle θs detected through the steering angle sensor 24 and the stroke Xw of the turning shaft 13 detected through the stroke sensor 34. The second system circuit 52 controls power supply to the winding set N22 of the second system in the turning-side motor 31 based on the steering angle θs detected through the steering angle sensor 24 and the stroke Xw of the turning shaft 13 detected through the stroke sensor 34.

The reaction force control device 40 and the reaction force motor 21 may be integrally provided so as to constitute a so-called mechano-electric reaction force actuator. The turning control device 50 and the turning-side motor 31 may be integrally provided so as to constitute a so-called mechano-electric turning actuator.

Power Supply Path

Next, a power supply path to the reaction force control device 40 and the turning control device 50 will be described. Various kinds of on-board control devices, including the reaction force control device 40 and the turning control device 50, are each supplied with electricity from a direct-current power source 60 installed in the vehicle. The direct-current power source 60 is, for example, a battery. Various sensors, including the torque sensor 23, the steering angle sensor 24, and the stroke sensor 34, are also each supplied with electricity from the direct-current power source 60.

The first system circuit 41 and the second system circuit 42 of the reaction force control device 40 and the first system circuit 51 and the second system circuit 52 of the turning control device 50 are each connected to the direct-current power source 60 through a start switch SW of the vehicle. The start switch SW is, for example, an ignition switch or a power switch. The start switch SW is operated when starting or stopping a driving source for traveling of the vehicle, such as an engine. When the start switch SW is turned on, electricity from the direct-current power source 60 is supplied through the start switch SW to the first system circuit 41 and the second system circuit 42 of the reaction force control device 40 as well as to the first system circuit 51 and the second system circuit 52 of the turning control device 50. Turning the start switch SW on means turning the vehicle power source on. Turning the start switch SW off means turning the vehicle power source off.

The first system circuit 41 and the second system circuit 42 of the reaction force control device 40 and the first system circuit 51 and the second system circuit 52 of the turning control device 50 are connected to the direct-current power source 60 through power source relays 60A, 60B, 60C, 60D. When the power source relays 60A, 60B, 60C, 60D are turned on, electricity from the direct-current power source 60 is supplied to the first system circuit 41 and the second system circuit 42 of the reaction force control device 40 as well as to the first system circuit 51 and the second system circuit 52 of the turning control device 50 through the power source relays 60A, 60B, 60C, 60D.

The first system circuit 41 of the reaction force control device 40 controls turning on and off of the power source relay 60A. When the start switch SW is switched from on to off, the first system circuit 41 executes power latching control of maintaining the power source relay 60A in an on-state for a given period. This allows the first system circuit 41 to operate even after the start switch SW is turned off. When the given period has elapsed, the first system circuit 41 can shut off power supply to itself by switching the power source relay 60A from on to off.

The first system circuit 41 detects turning on and off of the start switch SW by, for example, monitoring a voltage across ends of the start switch SW. When the voltage across the ends of the start switch SW falls below a given voltage threshold value, the first system circuit 41 detects that the start switch SW has been turned on. When the voltage across the ends of the start switch SW is equal to or higher than the given voltage threshold value, the first system circuit 41 detects that the start switch SW has been turned off.

The second system circuit 42 of the reaction force control device 40 controls turning on and off of the power source relay 60B. The second system circuit 42 executes power latching control in the same manner as the first system circuit 41. When the start switch SW is switched from on to off, the second system circuit 42 maintains the power source relay 60B in an on-state for a given period.

The first system circuit 51 of the turning control device 50 controls turning on and off of the power source relay 60C. The first system circuit 51 executes power latching control in the same manner as the first system circuit 41 of the reaction force control device 40. When the start switch SW is switched from on to off, the first system circuit 51 maintains the power source relay 60C in an on-state for a given period.

The second system circuit 52 of the turning control device 50 controls turning on and off of the power source relay 60D. The second system circuit 52 executes power latching control in the same manner as the first system circuit 41 of the reaction force control device 40. When the start switch SW is switched from on to off, the second system circuit 52 maintains the power source relay 60D in an on-state for a given period.

Among the constituent elements of the steering system 10, constituent elements that are required to operate also after the start switch SW is turned off, such as the torque sensor 23, the steering angle sensor 24, and the stroke sensor 34, are connected to the direct-current power source 60 through at least one of the power source relays 60A, 60B, 60C, 60D. Therefore, also when the start switch SW is off, if at least one of the power source relays 60A, 60B, 60C, 60D is on, power supply to the constituent elements, such as the torque sensor 23, the steering angle sensor 24, and the stroke sensor 34, is continued.

Reaction Force Control Device

Next, the configuration of the reaction force control device will be described in detail. As shown in FIG. 2, the reaction force control device 40 has the first system circuit 41 and the second system circuit 42. The first system circuit 41 has a first reaction force control circuit 41A and a motor driving circuit 41B. The second system circuit 42 has a second reaction force control circuit 42A and a motor driving circuit 42B.

The first reaction force control circuit 41A is formed by a processing circuit including (1) one or more processors that operate in accordance with a computer program (software); (2) one or more dedicated hardware circuits, such as application-specific integrated circuits (ASICs), that execute at least some of various processes; and (3) a combination of (1) and (2). The processor includes a central processing unit (CPU). The processor includes memories, such as a random-access memory (RAM) and a read-only memory (ROM). The memories store program codes or commands configured to make the CPU execute processes. The memories, i.e., non-transitory computer-readable media include all available media that can be accessed by a general-purpose or special-purpose computer.

The first reaction force control circuit 41A calculates a target steering reaction force to be generated in the reaction force motor 21 based on the steering torque Th detected through the torque sensor 23, and calculates a first current command value for the winding set N11 of the first system according to this calculated value of the target steering reaction force. The first current command value is set to a value of half (50%) of a current amount (100%) that is required to generate the target steering reaction force in the reaction force motor 21. The first reaction force control circuit 41A generates a driving signal (PWM signal) to the motor driving circuit 41B by executing current feedback control of adapting the actual value of the current supplied to the winding set N11 of the first system to the first current command value.

The motor driving circuit 41B is a PWM inverter in which two switching elements, such as field-effect transistors (FET), connected in series constitute a leg as a basic unit, and three legs corresponding to the respective three phases (U, V, W) are connected in parallel. The motor driving circuit 41B converts direct-current power supplied from the direct-current power source 60 into three-phase alternating-current power as the switching elements of the respective phases switch based on a driving signal generated by the first reaction force control circuit 41A. The three-phase alternating-current power generated by the motor driving circuit 41B is supplied to the winding set N11 of the first system of the reaction force motor 21 through a power supply path of each phase formed by a busbar, a cable, or the like. Thus, the winding set N11 of the first system generates a torque according to the first current command value.

The second reaction force control circuit 42A has basically the same configuration as the first reaction force control circuit 41A. The second reaction force control circuit 42A calculates a target steering reaction force to be generated in the reaction force motor 21 based on the steering torque Th detected through the torque sensor 23, and calculates a second current command value for the winding set N12 of the second system according to this calculated value of the target steering reaction force. The second current command value is set to a value of half (50%) of a current amount that is required to generate the target steering reaction force in the reaction force motor 21. The second reaction force control circuit 42A generates a driving signal to the motor driving circuit 42B by executing current feedback control of adapting the actual value of the current supplied to the winding set N12 of the second system to the second current command value.

The motor driving circuit 42B has basically the same configuration as the motor driving circuit 41B. The motor driving circuit 42B converts direct-current power supplied from the direct-current power source 60 into three-phase alternating-current power based on a driving signal generated by the second reaction force control circuit 42A. The three-phase alternating-current power generated by the motor driving circuit 42B is supplied to the winding set N12 of the second system of the reaction force motor 21 through a power supply path of each phase formed by a busbar, a cable, or the like. Thus, the winding set N12 of the second system generates a torque according to the second current command value. The reaction force motor 21 generates a torque that is a total of the torque generated by the winding set N11 of the first system and the torque generated by the winding set N12 of the second system.

There is a master-slave relationship between the first system circuit 41 and the second system circuit 42 of the reaction force control device 40. In this case, for example, the first system circuit 41 functions as the master and the second system circuit 42 functions as the slave.

Turning Control Device

Next, the configuration of the turning control device 50 will be described in detail. As shown in FIG. 2, the turning control device 50 has the first system circuit 51 and the second system circuit 52. The first system circuit 51 has a first turning control circuit 51A and a motor driving circuit 51B. The second system circuit 52 has a second turning control circuit 52A and a motor driving circuit 52B.

The first turning control circuit 51A has basically the same configuration as the first reaction force control circuit 41A. The first turning control circuit 51A calculates a target turning angle of the turning wheels 15 based on the steering angle θs detected through the steering angle sensor 24. The first turning control circuit 51A calculates the turning angle θw based on the stroke Xw of the turning shaft 13 detected through the stroke sensor 34. The first turning control circuit 51A calculates a target turning force to be generated in the turning-side motor 31 through execution of angle feedback control of adapting the turning angle θw calculated based on the stroke Xw to the target turning angle, and calculates a third current command value to the winding set N21 of the first system of the turning-side motor 31 according to this calculated value of the target turning force. The third current command value is set to a value of half (50%) of a current amount that is required to generate the target turning force in the turning-side motor 31. The first turning control circuit 51A generates a driving signal to the motor driving circuit 51B by executing current feedback control of adapting the actual value of the current supplied to the winding set N21 of the first system to the third current command value.

The motor driving circuit 51B has basically the same configuration as the motor driving circuit 41B. The motor driving circuit 51B converts the direct-current power supplied from the direct-current power source 60 into three-phase alternating-current power based on a driving signal generated by the first turning control circuit 51A. The three-phase alternating-current power generated by the motor driving circuit 42B is supplied to the winding set N21 of the first system of the turning-side motor 31 through a power supply path of each phase formed by a busbar, a cable, or the like. Thus, the winding set N21 of the first system generates a torque according to the third current command value.

The second turning control circuit 52A has basically the same configuration as the first reaction force control circuit 41A. The second turning control circuit 52A calculates a target turning angle of the turning wheels 15 based on the steering angle θs detected through the steering angle sensor 24. The second turning control circuit 52A calculates the turning angle θw based on the stroke Xw of the turning shaft 13 detected through the stroke sensor 34. The second turning control circuit 52A calculates a target turning force to be generated in the turning-side motor 31 through execution of angle feedback control of adapting the turning angle θw calculated based on the stroke Xw to the target turning angle, and calculates a fourth current command value to the winding set N22 of the second system of the turning-side motor 31 according to this calculated value of the target turning force. The fourth current command value is set to a value of half (50%) of a current amount that is required to generate the target turning force in the turning-side motor 31. The second turning control circuit 52A generates a driving signal to the motor driving circuit 52B by executing current feedback control of adapting the actual current value supplied to the winding set N22 of the second system to the fourth current command value.

The motor driving circuit 52B has basically the same configuration as the motor driving circuit 41B. The motor driving circuit 52B converts the direct-current power supplied from the direct-current power source 60 into three-phase alternating-current power based on a driving signal generated by the second turning control circuit 52A. The three-phase alternating current power generated by the motor driving circuit 52B is supplied to the winding set N22 of the second system of the turning-side motor 31 through a power supply path of each phase formed by a busbar, a cable, or the like. Thus, the winding set N22 of the second system generates a torque according to the fourth current command value. The turning-side motor 31 generates a torque that is a total of the torque generated by the winding set N21 of the first system and the torque generated by the winding set N22 of the second system.

There is a master-slave relationship between the first system circuit 51 and the second system circuit 52 of the turning control device 50. In this case, for example, the first system circuit 51 functions as the master and the second system circuit 52 functions as the slave.

Communication Paths

Next, communication paths inside the reaction force control device 40 and the turning control device 50 and communication paths between the reaction force control device 40 and the turning control device 50 will be described.

As shown in FIG. 2, the first reaction force control circuit 41A and the second reaction force control circuit 42A exchange pieces of information with each other through a communication line L1. These pieces of information include information on an abnormality of the first reaction force control circuit 41A, the second reaction force control circuit 42A, or the motor driving circuits 41B, 42B. These pieces of information also include values of flags showing various states. The first reaction force control circuit 41A and the second reaction force control circuit 42A control the driving of the reaction force motor 21 by collaborating with each other based on the pieces of information exchanged therebetween.

The first turning control circuit 51A and the second turning control circuit 52A exchange pieces of information with each other through a communication line L2. These pieces of information include information on an abnormality of the first turning control circuit 51A, the second turning control circuit 52A, or the motor driving circuits 51B, 52B. These pieces of information also include values of flags showing various states. The first turning control circuit 51A and the second turning control circuit 52A control the driving of the turning-side motor 31 by collaborating with each other based on the pieces of information exchanged therebetween.

The first reaction force control circuit 41A and the first turning control circuit 51A exchange pieces of information with each other through a communication line L3. These pieces of information include information on an abnormality of the first reaction force control circuit 41A, the first turning control circuit 51A, and the motor driving circuits 41B, 51B. These pieces of information also include values of flags showing various states. The first reaction force control circuit 41A and the first turning control circuit 51A operate in conjunction with each other based on the pieces of information exchanged therebetween.

The second reaction force control circuit 42A and the second turning control circuit 52A exchange pieces of information with each other through a communication line L4. These pieces of information include information on an abnormality of the second reaction force control circuit 42A, the second turning control circuit 52A, or the motor driving circuits 42B, 52B. These pieces of information also include values of flags showing various states. The second reaction force control circuit 42A and the second turning control circuit 52A operate in conjunction with each other based on the pieces of information exchanged therebetween.

Driving Modes of Motor

Next, driving modes of the reaction force motor 21 and the turning-side motor 31 will be described. The driving modes include a collaborative driving mode, an independent driving mode, and a single-system driving mode.

The collaborative driving mode is a driving mode that is entered at normal times when the first system circuits 41, 51 and the second system circuits 42, 52 are operating normally. The first system circuit 41 and the second system circuit 42 share pieces of information, such as a command value and a limit value, and generate an equal torque in both of the winding set N11 of the first system and the winding set N12 of the second system of the reaction force motor 21. The first system circuit 51 and the second system circuit 52 share pieces of information, such as a command value and a limit value, and generate an equal torque in both of the winding set N21 of the first system and the winding set N22 of the second system of the turning-side motor 31.

In the case where there is a master-slave relationship between the first system circuit 41 and the second system circuit 42 of the reaction force control device 40, when the collaborative driving mode is selected as the driving mode, the slave controls driving of the reaction force motor 21 using a command value calculated by the master. In the case where there is a master-slave relationship between the first system circuit 51 and the second system circuit 52 of the turning control device 50, when the collaborative driving mode is selected as the driving mode, the slave controls driving of the turning-side motor 31 using a command value calculated by the master.

The independent driving mode is a driving mode that is entered when the operation of one of the four control circuits (41A, 42A, 51A, 52A) has stopped momentarily but an abnormality is not confirmed and there is a possibility of restoration to normal operation. In the independent driving mode, for example, when there is a possibility that one control circuit that has stopped operating may restore normal operation, the other three control circuits generate a torque in the corresponding winding sets based on their own calculation results without using information obtained through inter-system communication.

In the case where there is a master-slave relationship between the first system circuit 41 and the second system circuit 42 of the reaction force control device 40, when the independent driving mode is selected as the driving mode, the master-slave relationship between the first system circuit 41 and the second system circuit 42 is temporarily dissolved. In the case where there is a master-slave relationship between the first system circuit 51 and the second system circuit 52 of the turning control device 50, when the independent driving mode is selected as the driving mode, the master-slave relationship between the first system circuit 51 and the second system circuit 52 is temporarily dissolved.

The single-system driving mode is a driving mode that is entered when an abnormality of one of the four control circuits (41A, 42A, 51A, 52A) has been confirmed and there is no possibility of restoration to normal operation. For example, when an abnormality of the first system circuits 41, 51 is confirmed, a torque is generated in the reaction force motor 21 and the turning-side motor 31 by the second system circuits 42, 52 alone. When an abnormality of the second system circuits 42, 52 is confirmed, a torque is generated in the reaction force motor 21 and the turning-side motor 31 by the first system circuits 41, 51 alone.

In the case where there is a master-slave relationship between the first system circuit 41 and the second system circuit 42 of the reaction force control device 40, when the single-system driving mode is selected as the driving mode, the master-slave relationship between the first system circuit 41 and the second system circuit 42 is temporarily dissolved. In the case where there is a master-slave relationship between the first system circuit 51 and the second system circuit 52 of the turning control device 50, when the single-system driving mode is selected as the driving mode, the master-slave relationship between the first system circuit 51 and the second system circuit 52 is temporarily dissolved.

At normal times when not experiencing an abnormality, the control circuits (41A, 42A, 51A, 52A) control driving of the motors (21, 31) in the collaborative driving mode. When an abnormality determination condition is met in a state where the collaborative driving mode is selected as the driving mode, each control circuit switches the driving mode from the collaborative driving mode to the independent driving mode. When a restoration determination condition is met before an abnormality is confirmed in a state where the independent driving mode is selected as the driving mode, each control circuit restores the driving mode from the independent driving mode to the collaborative driving mode. When an abnormality confirmation condition is met in a state where the independent driving mode is selected as the driving mode, each control circuit switches the driving mode from the independent driving mode to the single-system driving mode.

Examples of abnormalities include temporary abnormalities from which recovery is possible, such as an abnormality in inter-system communication, an abnormality in communication within the same system, a difference in command values between the systems, and a decrease in a current limit value.

Supplementary Description of Turning Control Device 50

Next, the configuration of the turning control device 50 will be supplementarily described. The turning control device 50 further has the following configurations (A1) to (A6).

(A1) The first system circuit 51 and the second system circuit 52 start as the vehicle power source turns on. At start-up, the first system circuit 51 and the second system circuit 52 calculate the rotation angle of the turning-side motor 31 as an absolute angle. The turning angle θw is an absolute angle. The first system circuit 51 and the second system circuit 52 start after confirming that the rotation angle of the turning-side motor 31 has been calculated normally.

(A2) The first system circuit 51 has a rotation detection circuit 51C (TC: turn counter). The second system circuit 52 has a rotation detection circuit 52C. The rotation detection circuits 51C, 52C take in electrical signals generated by the rotation angle sensor of the turning-side motor 31 on a given sampling cycle. The electrical signals are electrical signals corresponding to the rotation angle of the turning-side motor 31. The electrical signals include sine signals (sin signals) that change in a sine wave form relative to the rotation angle of the turning-side motor 31, and cosine signals (cos signals) that change in a cosine wave form relative to the rotation angle of the turning-side motor 31. The rotation detection circuits 51C, 52C calculate the rotation direction and the rotation speed of the turning-side motor 31 based on the sine signals and the cosine signals.

The rotation detection circuits 51C, 52C plot a coordinate (cos θb, sin θb) that is a combination of values of a sine signal and a cosine signal on an orthogonal coordinate system of "cos θb" and "sin θb," and detect the rotation direction of the turning-side motor 31 based on transition of a quadrant in which the plotted coordinate is located. The symbol "θb" represents the rotation angle of the turning-side motor 31. The rotation detection circuits 51C, 52C determine the quadrant in which the plotted coordinate is located based on whether the values of "sin θb" and "cos θb" are positive or negative. For example, when the coordinate has transitioned from the first quadrant to the second quadrant, the rotation detection circuits 51C, 52C determine that the rotation direction of the turning-side motor 31 is a positive direction. For example, when the coordinate has transitioned from the first quadrant to the fourth quadrant, the rotation detection circuits 51C, 52C determine that the rotation direction of the turning-side motor 31 is a reverse direction.

The rotation detection circuits 51C, 52C each has a counter. The rotation detection circuits 51C, 52C increase or decrease the count values by a certain value each time the quadrant in which the coordinate (cos θb, sin θb) that is a set of the values of a sine signal and a cosine signal is located switches. For example, the certain value is a positive natural number, such as one or two. When the rotation direction of the turning-side motor 31 is the positive direction, the rotation detection circuits 51C, 52C increase the count values by the certain value each time the coordinate transitions by one quadrant. When the rotation direction of the turning-side motor 31 is the reverse direction, the rotation detection circuits 51C, 52C decrease the count values by the certain value each time the coordinate transitions by one quadrant. The rotation detection circuits 51C, 52C detect the rotation speed of the turning-side motor 31 based on the count value.

The first turning control circuit 51A detects an abnormality of the two rotation detection circuits 51C, 52C by comparing count values of the two rotation detection circuits 51C, 52C. When the count values of the two rotation detection circuits 51C, 52C match, the first turning control circuit 51A determines that the two rotation detection circuits 51C, 52C are normal. When the count values of the two rotation detection circuits 51C, 52C do not match, the first turning control circuit 51A determines that one of the two rotation detection circuits 51C, 52C or both of the two rotation detection circuits 51C, 52C are abnormal.

The second turning control circuit 52A determines an abnormality of the two rotation detection circuits 51C, 52C in the same manner as the first turning control circuit 51A.

(A3) The first turning control circuit 51A is connected to the stroke sensor 34. The first turning control circuit 51A takes in electrical signals generated by the stroke sensor 34. The stroke sensor 34 serves to detect the absolute position of the turning shaft 13 in an axial direction. For example, the stroke sensor 34 may be of a kind provided on the pinion shaft 33. This kind of stroke sensor 34 detects the rotation angle of the pinion shaft 33 as an absolute angle. The rotation angle of the pinion shaft 33 can be converted into a stroke of the turning shaft 13 or a rotation angle of the turning-side motor 31.

Depending on the product specifications, the second turning control circuit 52A is not connected to the stroke sensor 34. In this case, the second turning control circuit 52A cannot take in electrical signals generated by the stroke sensor 34.

(A4) The first turning control circuit 51A has a function of detecting battery reset. Battery reset means that power supply from the direct-current power source 60, such as a battery, is interrupted. For example, when electricity from the direct-current power source 60 stops, the first turning control circuit 51A detects battery reset. As with the first turning control circuit 51A, the second turning control circuit 52A has a function of detecting battery reset.

(A5) The accuracy of the count numbers of the rotation detection circuits 51C, 52C cannot be guaranteed when, for example, the following cases B1 to B3 apply at start-up of the first turning control circuit 51A.

B1. A case where battery reset has occurred. When electricity from the direct-current power source 60 stops, the rotation detection circuits 51C, 52C cannot count the rotation speed of the turning-side motor 31.

B2. A case where an abnormality of the rotation detection circuits 51C, 52C is detected. In this case, it is unclear whether the rotation speed of the turning-side motor 31 is a correct value.

B3. A case where an abnormality of the rotation detection circuits 51C, 52C cannot be determined. In this case, it is unclear whether the rotation speed of the turning-side motor 31 is a correct value.

In the case of B1 to B3, therefore, the first turning control circuit 51A calculates an offset angle with reference to a neutral position of the turning shaft 13 using the detection result of the stroke sensor 34. The neutral position is the position of the turning shaft 13 when the vehicle is in a state of moving straight ahead. The offset angle is the stroke of the turning shaft 13 with reference to the neutral position of the turning shaft 13 or the rotation angle of the pinion shaft 33. The first turning control circuit 51A transmits the offset angle to the second turning control circuit 52A through the communication line L2. The first turning control circuit 51A stores the offset angle, and calculates the rotation angle of the turning-side motor 31 as an absolute angle based on the offset angle.

(A6) When these cases B1 to B3 do not apply, the first turning control circuit 51A calculates the rotation angle of the turning-side motor 31 as an absolute angle using the offset angle stored at start-up.

States of Turning Control Device 50

Next, states of the turning control device 50 will be described.

As shown in FIG. 3, states of the turning control device 50 are represented by, for example, the following items (C1) to (C6):

C1. Inter-microcomputer communication
C2. Driving state
C3. Battery reset
C4. TC initial state flag
C5. Implementation or no implementation of TC comparison
C6. TC initial state determination result (C1) "Inter-microcomputer communication" is communication between the first turning control circuit 51A and the second turning control circuit 52A. States of the inter-microcomputer communication include normal and abnormal.

(C2) "Driving state" includes a driving state of the first turning control circuit 51A and a driving state of the second turning control circuit 52A. "Main" in FIG. 3 represents the first turning control circuit 51A that is the master. "Sub" in FIG. 3 represents the second turning control circuit 52A that is the slave. Driving states include the collaborative driving mode, the independent driving mode, and the single-system driving mode described earlier, and shutdown. Shutdown includes shutdown due to a non-rotation-angle-related failure and shutdown due to a rotation-angle-related failure.

A non-rotation-angle-related failure is an abnormality of a device that does not affect the calculation of the rotation angle of the turning-side motor 31 by the rotation angle sensor of the turning-side motor 31, the rotation detection circuits 51C, 52C, etc. A non-rotation-angle-related failure includes a case where an abnormality is confirmed after the rotation angle of the turning-side motor 31 is calculated as an absolute angle and a case where an abnormality is confirmed before the rotation angle of the turning-side motor 31 is calculated as an absolute angle. A rotation-angle-related failure is an abnormality of a device that affects the calculation of the rotation angle of the turning-side motor 31 by the rotation angle sensor of the turning-side motor 31, the rotation detection circuits 51C, 52C, etc.

(C3) "Battery reset" shows whether battery reset has occurred. "Reset" in FIG. 3 shows that battery reset has occurred. The hyphens "-" in FIG. 3 show that battery reset has not occurred.

(C4) "TC initial state flag" shows whether the two rotation detection circuits 51C, 52C are normal. When it is determined that the two rotation detection circuits 51C, 52C are normal, the first turning control circuit 51A sets the value of the TC initial state flag to "normal." When the value of the TC initial state flag is set to "normal," the rotation detection circuits 51C, 52C can be used. When it is determined that one of the two rotation detection circuits 51C, 52C is abnormal, the first turning control circuit 51A sets the value of the TC initial state flag to "invalid." When the value of the TC initial state flag is set to "invalid," the rotation detection circuits 51C, 52C cannot be used. The hyphens "-" in FIG. 3 show that these states need not be considered.

When the value of the TC initial state flag is "normal," the first turning control circuit 51A calculates the rotation angle of the turning-side motor 31 as an absolute angle using the stored offset angle. When the value of the TC initial state flag is "invalid," the first turning control circuit 51A calculates the offset angle with reference to the neutral position of the turning shaft 13 using the detection result of the stroke sensor 34. The first turning control circuit 51A calculates the rotation angle of the turning-side motor 31 as an absolute angle using the calculated offset angle.

(C5) "Implementation or no implementation of TC comparison" shows whether to perform a process of comparing the count values of the two rotation detection circuits 51C, 52C. "Implementation" in FIG. 3 shows that the process of comparing the count values of the two rotation detection circuits 51C, 52C is performed. "No implementation" in FIG. 3 shows that the process of comparing the count values of the two rotation detection circuits 51C, 52C is not performed.

For example, when the first turning control circuit 51A starts in the single-system mode with the second turning control circuit 52A shut down, the process of comparing the count values of the two rotation detection circuits 51C, 52C cannot be performed. In this case, an abnormality of the rotation detection circuits 51C, 52C cannot be detected. Therefore, an offset angle with reference to the neutral position of the turning shaft 13 is calculated using the detection result of the stroke sensor 34. Using the calculated offset angle, the first turning control circuit 51A calculates the rotation angle of the turning-side motor 31 as an absolute angle.

In some cases, however, after the rotation angle of the turning-side motor 31 is calculated as an absolute angle using the stored offset angle, the second turning control circuit 52A, for example, may shut down due to a non-rotation-angle-related failure. In this case, the state of "implementation or no implementation of TC comparison" is "implementation."

(C6) "TC initial state determination result" shows whether the rotation speed of the turning-side motor 31 has been continuously counted by the rotation detection circuits 51C, 52C during a period in which the vehicle power source has been off. "Continuous" in FIG. 3 shows that counting of the rotation detection circuits 51C, 52C has been continuously performed. "Not continuous" in FIG. 3 shows that counting of the rotation detection circuits 51C, 52C has not been continuously performed. The hyphens "-" in FIG. 3 show that these states need not be considered.

For example, when battery reset occurs, the rotation detection circuits 51C, 52C cannot count the rotation speed of the turning-side motor 31. Therefore, the TC initial state determination result is "not continuous." When the TC initial state determination result is "not continuous," the accuracy of the count numbers of the rotation detection circuits 51C, 52C cannot be guaranteed. Therefore, when the TC initial state determination result is "not continuous," an offset angle with reference to the neutral position of the turning shaft 13 is calculated using the detection result of the stroke sensor 34. Using the calculated offset angle, the first turning control circuit 51A calculates the rotation angle of the turning-side motor 31 as an absolute angle.

The first turning control circuit 51A calculates the rotation angle of the turning-side motor 31 as an absolute angle using the stored offset angle when all of the following four conditions (D1) to (D4) are met.

D1. That battery reset has not occurred
D2. That the value of the TC initial state flag is "normal"
D3. That implementation or no implementation of TC comparison is "implementation"
D4. That the TC initial state determination result is "continuous"

When at least one of the four conditions (D1) to (D4) is not met, the first turning control circuit 51A calculates an offset angle with reference to the neutral position of the turning shaft 13 using the detection result of the stroke sensor 34. Using the calculated offset angle, the first turning control circuit 51A calculates the rotation angle of the turning-side motor 31 as an absolute angle.

The second turning control circuit 52A operates basically in the same manner as the first turning control circuit 51A. However, the turning control device 50 has the following matters of concern.

As indicated in the bottom row of FIG. 3, a situation can arise where the first turning control circuit 51A, which is the master, does not start when the vehicle power source is turned on. As the first turning control circuit 51A is maintained in the state of being shut down, the second turning control circuit 52A, which is originally the slave, starts in the single-system mode, for example.

However, since the first turning control circuit 51A is shut down, an abnormality of the rotation detection circuits 51C, 52C cannot be determined. This makes it necessary for the second turning control circuit 52A to calculate the offset angle with reference to the neutral position of the turning shaft 13, and further the rotation angle of the turning-side motor 31 as an absolute angle, using the detection result of the stroke sensor 34. However, when the second turning control circuit 52A is not configured to take in the detection result of the stroke sensor 34, the second turning control circuit 52A cannot calculate the offset angle and further the rotation angle of the turning-side motor 31 as an absolute angle. Thus, there is a concern that the second turning control circuit 52A may be unable to start.

This event may occur also when, for example, the vehicle power source is turned on in a state where a power line that supplies electricity to the first turning control circuit 51A is broken. Therefore, this embodiment employs the following configuration.

In the case where the first turning control circuit 51A that is the master does not start when the vehicle power source is turned on, the second turning control circuit 52A that is the slave compares the rotation angle of the turning-side motor 31 that was stored when the vehicle power source was turned off last time and the rotation angle of the turning-side motor 31 that is calculated from the stored offset angle.

When the absolute value of the difference between the rotation angle of the turning-side motor 31 that was stored when the vehicle power source was turned off last time and the rotation angle of the turning-side motor 31 that is calculated from the offset angle is equal to or smaller than a given threshold value, the second turning control circuit 52A determines that there is no abnormality in the rotation detection circuits 51C, 52C. In this case, the second turning control circuit 52A starts using the rotation angle of the turning-side motor 31 calculated from the offset angle. This is because, if control is executed based on the rotation angle of the turning-side motor 31 that was stored when the vehicle power source was turned off last time, differences due to detection errors of the rotation angle sensor of the turning-side motor 31 may be integrated.

That is, in the case where the second turning control circuit 52A that is the slave starts in the single-system mode as indicated in the bottom row of FIG. 3, the second turning control circuit 52A starts by regarding the value of the TC initial state flag of the second turning control circuit 52A as "normal" when it is confirmed that there is no abnormality in the rotation detection circuits 51C, 52C.

This is based on the premise that an event that causes a change in the turning angle θw, such as jacking up the vehicle, does not occur in the normal use state of the vehicle. When the absolute value of the difference between the rotation angle of the turning-side motor 31 that was stored when the vehicle power source was turned off last time and the rotation angle of the turning-side motor 31 that is calculated from the offset angle exceeds the given threshold value, the second turning control circuit 52A determines that there may be an abnormality in the rotation detection circuits 51C, 52C. In this case, the second turning control circuit 52A does not start.

This is for the following reason: In the case where, during a period from when the vehicle power source is turned off until it is turned on again, the turning angle θw changes to such an extent that the absolute value of the difference between the rotation angle of the turning-side motor 31 that was stored when the vehicle power source was turned off last time and the rotation angle of the turning-side motor 31 that is calculated when the vehicle power source is turned on this time exceeds the threshold value, the vehicle may deflect. Deflection of the vehicle means that the vehicle that is supposed to move straight ahead deflects.

Processing Procedure of Second Turning Control Circuit 52A Upon Turning Off of Vehicle Power Source Next, a processing procedure of the second turning control circuit 52A when the vehicle power source is turned off will be described.

Figure 4:
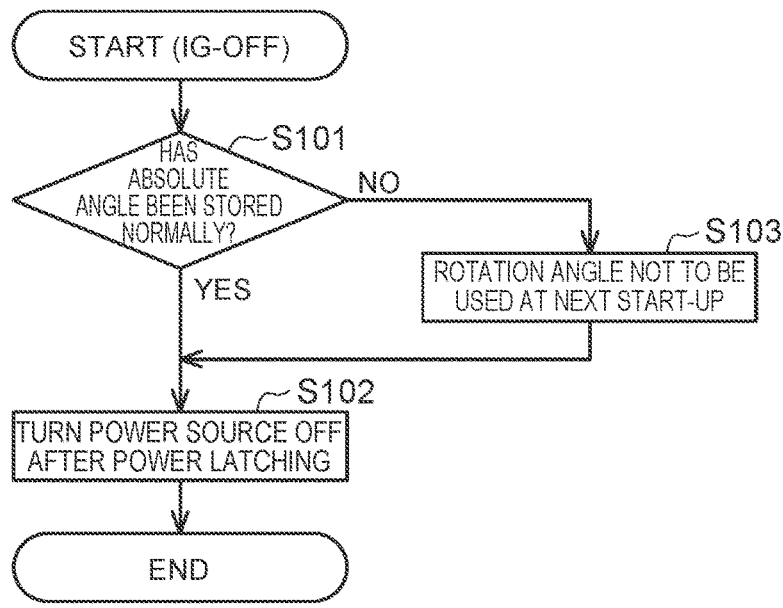
FIG. 4 is a flowchart showing a processing procedure of a second turning control circuit when a vehicle power source is turned off.

As shown in the flowchart of FIG. 4, when the vehicle power source is turned off (IG-OFF), the second turning control circuit 52A stores the rotation angle of the turning-side motor 31 at that time. The rotation angle is an absolute angle. The second turning control circuit 52A determines whether the rotation angle of the turning-side motor 31 has been stored normally (step S101).

The second turning control circuit 52A determines that the rotation angle of the turning-side motor 31 has been stored normally (YES in step S101), for example, when no rotation-angle-related failure has occurred in the corresponding system before execution of the power latching control, and when no error in writing into the memory has occurred. In this case, the second turning control circuit 52A also stores that the stored rotation angle of the turning-side motor 31 can be used at the next start-up. After a given execution period of the power latching control has elapsed, the second turning control circuit 52A turns the power source off (step S102).

When a rotation-angle-related failure has occurred in the corresponding system before execution of the power latching control, or when an error in writing into the memory is detected, the second turning control circuit 52A determines that the rotation angle of the turning-side motor 31 has not been stored normally (NO in step S101). In this case, the second turning control circuit 52A also stores that the stored rotation angle of the turning-side motor 31 cannot be used at the next start-up (step S103). After the given execution period of the power latching control has elapsed, the second turning control circuit 52A turns the power source off (step S102).

Processing Procedure of Second Turning Control Circuit 52A Upon Turning on of Vehicle Power Source Next, a processing procedure of the second turning control circuit 52A when the vehicle power source is turned on will be described.

Figure 5:
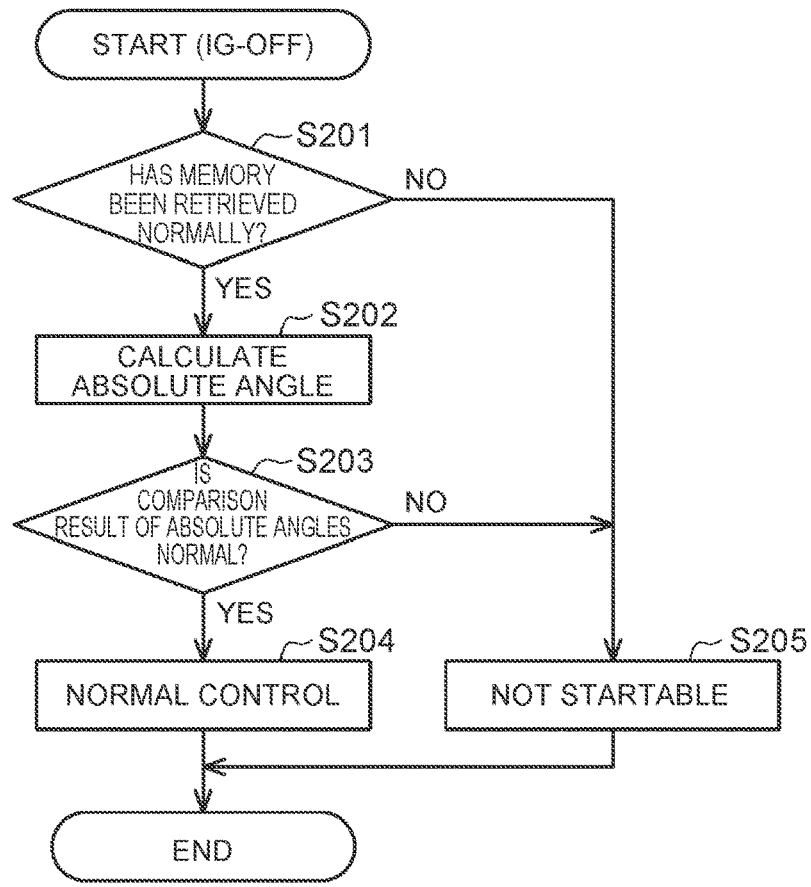

As shown in the flowchart of FIG. 5, when the vehicle power source is turned on (IG-ON), the second turning control circuit 52A retrieves the rotation angle of the turning-side motor 31 stored in the memory. The rotation angle is the rotation angle of the turning-side motor 31 that was stored in the memory when the vehicle power source was turned off last time. The rotation angle is an absolute angle. The second turning control circuit 52A determines whether the rotation angle of the turning-side motor 31 has been retrieved normally (step S201).

In the case where the rotation angle of the turning-side motor 31 has been retrieved normally (YES in step S201), the second turning control circuit 52A regards its own TC initial state flag (TC initial state flag of the second turning control circuit 52A) as "normal" when the driving mode thereof is the single-system driving mode. In this case, the second turning control circuit 52A calculates the rotation angle of the turning-side motor 31 (step S202). The second turning control circuit 52A calculates the rotation angle of the turning-side motor 31 as an absolute angle using the stored offset angle.

Next, when the rotation angle of the turning-side motor 31 having been retrieved from the memory can be used, the second turning control circuit 52A compares the rotation angle of the turning-side motor 31 retrieved from the memory and the rotation angle of the turning-side motor 31 calculated in the preceding step S202. The second turning control circuit 52A determines whether the comparison result is normal (step S203).

When the absolute value of the difference between the rotation angle of the turning-side motor 31 retrieved from the memory and the rotation angle of the turning-side motor 31 calculated in the preceding step S202 is equal to or smaller than a given threshold value, the second turning control circuit 52A determines that the comparison result is normal (YES in step S203). That the comparison result is normal also means that the second rotation detection circuits 51C, 52C are normal.

When the comparison result is normal, the second turning control circuit 52A starts executing normal control. The normal control here is control in the single-system mode. When the absolute value of the difference between the rotation angle of the turning-side motor 31 retrieved from the memory and the rotation angle of the turning-side motor 31 calculated in the preceding step S202 exceeds the given threshold value, the second turning control circuit 52A determines that the comparison result is not normal (NO in step S203). When the comparison result is not normal, the second turning control circuit 52A determines that it is not startable (S205) and ends the process. Being not startable is a state of being unable to start.

Also when the rotation angle of the turning-side motor 31 has not been retrieved normally (NO in step S201), the second turning control circuit 52A determines that it is not startable (S205) and ends the process.

Detection Errors of Rotation Angle Sensor

Next, detection errors of the rotation angle sensor of the turning-side motor 31 will be described. Here, the following items (E1) to (E5) are assumed.

(E1) During a period in which the vehicle power source is on and a period in which the vehicle power source is off, the rotation angle of the turning-side motor 31 does not change from 0° that is a true value. The rotation angle is an absolute angle.

(E2) The rotation detection circuits 51C, 52C are normal.

(E3) Variations of the rotation angle sensor signal at normal times is, for example, ±α°.

(E4) If the variations of the rotation angle sensor of the turning-side motor 31 are within an allowable range for deflection of the vehicle, the second turning control circuit 52A can start.

(E5) The allowable range for deflection of the vehicle is such a range that the rotation angle of the turning-side motor 31 detected through the rotation angle sensor can be determined as normal, and is, for example, ±2α°. The allowable range is set based on variations of the rotation angle that is stored in the memory when the vehicle power source is turned off and variations of the rotation angle that is calculated when the vehicle power source is turned on next time.

The following three cases F1 to F3 will be considered.

F1. N-Th Time of Turning on of Vehicle Power Source

Figure 6A:
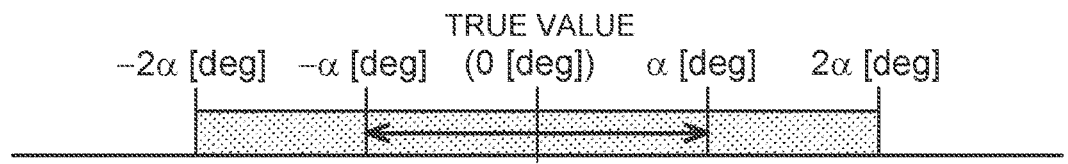
FIG. 6A is a view for verifying whether detection errors of a rotation angle sensor build up.

As shown in FIG. 6A, when the rotation angle of the turning-side motor 31 stored in the memory is 0° that is a true value and the rotation angle of the turning-side motor 31 calculated at start-up is α°, the calculated rotation angle of the turning-side motor 31 is within the allowable range for deflection of the vehicle, specifically, a value that is "not smaller than −2α° and not larger than 2α°." Therefore, the second turning control circuit 52A can start.

F2. N+1-Th Time of Turning on of Vehicle Power Source

Figure 6B:
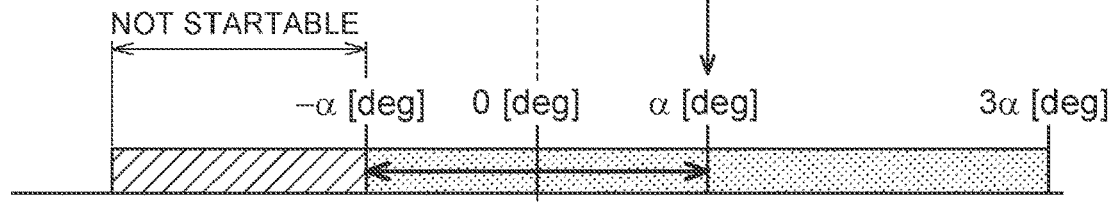
FIG. 6B is another view for verifying whether detection errors of the rotation angle sensor build up.

As shown in FIG. 6B, when the rotation angle of the turning-side motor 31 stored in the memory is α° and the rotation angle of the turning-side motor 31 calculated at start-up is −α°, the rotation angle of the turning-side motor 31 is within the allowable range for deflection of the vehicle, specifically, a value that is "not smaller than −α° and not larger than 3α°." Therefore, the second turning control circuit 52A can start.

F3. N+2-Th Time of Turning on of Vehicle Power Source

Figure 6C:
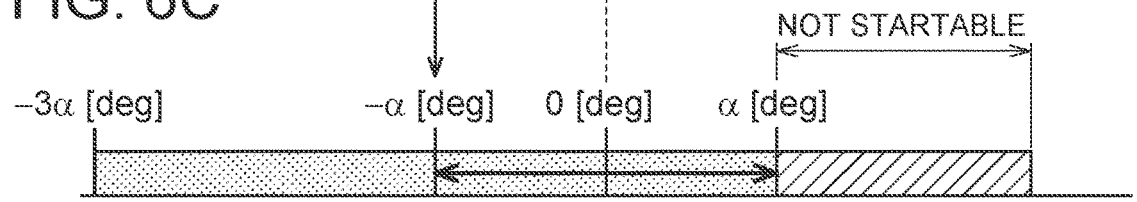
FIG. 6C is another view for verifying whether detection errors of the rotation angle sensor build up.

As shown in FIG. 6C, when the rotation angle of the turning-side motor 31 stored in the memory is α° and the rotation angle of the turning-side motor 31 calculated at start-up is α°, the rotation angle of the turning-side motor 31 is within the allowable range for deflection of the vehicle, specifically, a value that is "not smaller than −3α° and not larger than α°." Therefore, the second turning control circuit 52A can start.

Thus, errors in detecting the rotation angle of the turning-side motor 31 do not build up even when a maximum error occurs for the rotation angle of the turning-side motor 31 that is stored in the memory when the vehicle power source is turned off and the rotation angle of the turning-side motor 31 that is calculated when the vehicle power source is turned on next time.

Advantages of First Embodiment

The first embodiment offers the following advantages.

(1-1) The second turning control circuit 52A is configured to start when the vehicle power source is turned on and the absolute value of the difference between the absolute rotation angle of the turning-side motor 31 that was stored when the vehicle power source was turned off last time and the absolute rotation angle of the turning-side motor 31 that is calculated when the vehicle power source is turned on this time is equal to or smaller than the given threshold value, regardless of whether it is detected that an abnormality has occurred in one of the two rotation detection circuits 51C, 52C or an abnormality of the two rotation detection circuits 51C, 52C is not determinable.

When the absolute value of the difference between the absolute rotation angle of the turning-side motor 31 that was stored when the vehicle power source was turned off and the absolute rotation angle of the turning-side motor 31 that is calculated when the vehicle power source is turned on this time is equal to or smaller than the given threshold value, the rotation detection circuits 51C, 52C can be said to be normal. That is, in the case where the first turning control circuit 51A that is the master does not start when the vehicle power source is turned on, unless the turning angle θw has changed due to an external force being applied during parking or other causes, the second turning control circuit 52A that is the slave can start appropriately. Driving of the motor is controlled by the second turning control circuit 52A.

The first turning control circuit 51A may be configured to operate in the same manner as the second turning control circuit 52A.

(1-2) The steering system 10 has the stroke sensor 34 that detects the absolute position of the turning shaft 13 in the axial direction. When the vehicle power source is turned on and it is detected that an abnormality has occurred in one of the two rotation detection circuits 51C, 52C or an abnormality of the two rotation detection circuits 51C, 52C is not determinable, the first turning control circuit 51A can calculate the absolute rotation angle of the turning-side motor 31 using the detection result of the stroke sensor 34.

(1-3) In the case where the first turning control circuit 51A that is the master does not start when the vehicle power source is turned on, when it is confirmed that there is no abnormality in the rotation detection circuits 51C, 52C, the second turning control circuit 52A can start using the rotation angle of the turning-side motor 31 stored in the memory.

(1-4) The turning-side motor 31 is required to start as far as possible, even with a single system. This requirement can be met.

Second Embodiment

Next, a second embodiment in which the vehicle control device is embodied in an electric power steering system will be described. Those members that are the same as in the first embodiment will be denoted by the same reference signs and detailed description thereof will be omitted.

The electric power steering system has the steering wheel 11 and the turning wheels 15 shown in FIG. 1 described earlier that are mechanically coupled to each other. That is, the steering shaft 12, the pinion shaft 33, and the turning shaft 13 function as a power transmission path between the steering wheel 11 and the turning wheels 15. As the steering wheel 11 is steered, the turning shaft 13 moves linearly, causing a change in the turning angle θw of the turning wheels 15.

The electric power steering system has an assist motor and an assistance control device. The assist motor is provided at the same position as the reaction force motor 21 or the turning-side motor 31 shown in FIG. 1 described earlier. The assist motor generates an assistive force for assisting the operation of the steering wheel 11. The assistive force is a torque in the same direction as the steering direction of the steering wheel 11. The assistance control device controls driving of the assist motor that is a control target.

Figure 7:
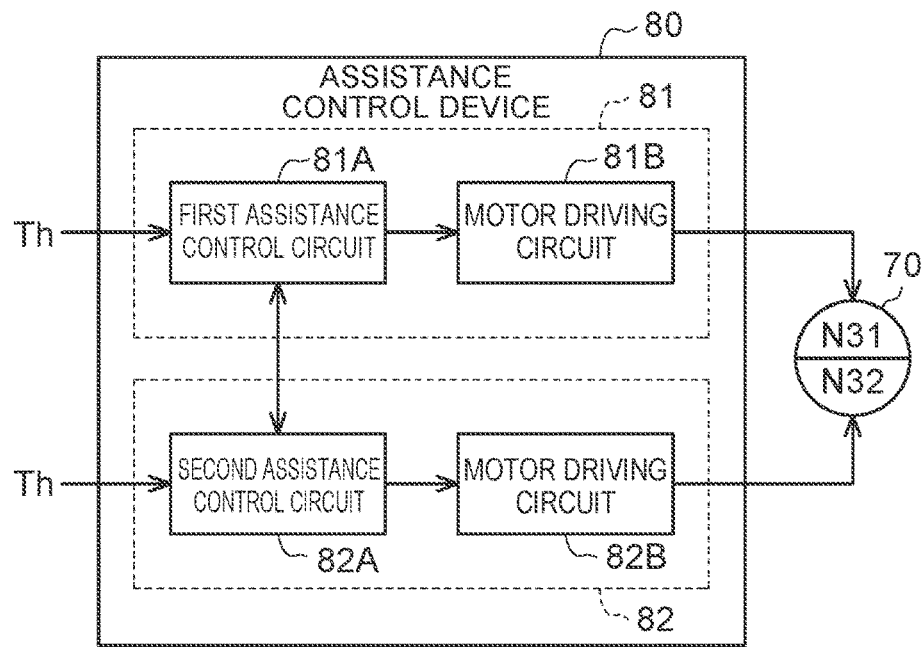
FIG. 7 is a configuration diagram of a second embodiment of the vehicle control device.

As shown in FIG. 7, an assist motor 70 has a winding set N31 of a first system and a winding set N32 of a second system. An assistance control device 80 has a first system circuit 81. The first system circuit 81 has a first assistance control circuit 81A and a motor driving circuit 81B. The first assistance control circuit 81A controls power supply to the winding set N31 of the first system. The first assistance control circuit 81A generates a driving signal to the motor driving circuit 81B based on the steering torque Th detected through the torque sensor 23.

The motor driving circuit 81B converts the direct-current power supplied from the direct-current power source 60 into three-phase alternating-current power based on the driving signal generated by the first assistance control circuit 81A. The three-phase alternating-current power generated by the motor driving circuit 81B is supplied to the winding set N31 of the first system of the assist motor 70 through a power supply path of each phase formed by a busbar, a cable, or the like.

The assistance control device 80 has a second system circuit 82. The second system circuit 82 has a second assistance control circuit 82A and a motor driving circuit 82B. The second assistance control circuit 82A controls power supply to the winding set N32 of the second system. The second assistance control circuit 82A generates a driving signal to the motor driving circuit 82B based on the steering torque Th detected through the torque sensor 23.

The motor driving circuit 82B converts the direct-current power supplied from the direct-current power source 60 into three-phase alternating-current power based on the driving signal generated by the second assistance control circuit 82A. The three-phase alternating-current power generated by the motor driving circuit 82B is supplied to the winding set N32 of the second system of the assist motor 70 through a power supply path of each phase formed by a busbar, a cable, or the like.

The first assistance control circuit 81A and the second assistance control circuit 82A exchange pieces of information with each other through a communication line. These pieces of information include information on an abnormality of the first assistance control circuit 81A, the second assistance control circuit 82A, or the motor driving circuits 81B, 82B. These pieces of information also include values of various flags. The first assistance control circuit 81A and the second assistance control circuit 82A control driving of the assist motor 70 by collaborating with each other based on the pieces of information exchanged therebetween.

The first assistance control circuit 81A has basically the same configuration as the first turning control circuit 51A shown in FIG. 2 described earlier. The second assistance control circuit 82A has basically the same configuration as the second turning control circuit 52A shown in FIG. 2 described earlier. As with the control circuits (41A, 42A, 51A, 52A) in the first embodiment, the first assistance control circuit 81A and the second assistance control circuit 82A control driving of the assist motor 70 in one of a collaborative driving mode, an independent driving mode, and a single-system driving mode.

There is a master-slave relationship between the first system circuit 81 and the second system circuit 82 of the assistance control device 80. In this case, for example, the first system circuit 81 functions as the master and the second system circuit 82 functions as the slave.

In the case where the first assistance control circuit 81A that is the master does not start when the vehicle power source is turned on, the second assistance control circuit 82A that is the slave performs the same operation as the second turning control circuit 52A in the first embodiment.

The second assistance control circuit 82A compares the rotation angle of the assist motor 70 that was stored when the vehicle power source was turned off last time and the rotation angle of the assist motor 70 that is calculated from the stored offset angle.

When the absolute value of the difference between the rotation angle of the assist motor 70 that was stored when the vehicle power source was turned off last time and the rotation angle of the assist motor 70 that is calculated from the offset angle is equal to or smaller than a given threshold value, the second assistance control circuit 82A determines that there is no abnormality in the rotation detection circuits 51C, 52C. In this case, the second assistance control circuit 82A starts using the rotation angle of the assist motor 70 calculated from the offset angle.

That is, as indicated in the bottom row of FIG. 3, in the case where the second assistance control circuit 82A that is the slave starts in the single-system mode, when it is confirmed that there is no abnormality in the rotation detection circuits 51C, 52C, the second assistance control circuit 82A starts by regarding the value of the TC initial state flag of the second assistance control circuit 82A as "normal."

When the difference between the rotation angle of the assist motor 70 that was stored when the vehicle power source was turned off last time and the rotation angle of the assist motor 70 that is calculated from the offset angle exceeds the given threshold value, the second assistance control circuit 82A determines that there may be an abnormality in the rotation detection circuits 51C, 52C. In this case, the second assistance control circuit 82A does not start.

Thus, the second embodiment offers the following advantage in addition to the advantages described in (1-1) to (1-3) of the first embodiment.

(2-1) The assist motor 70 is required to start as far as possible, even with a single system. This requirement can be met.

What is claimed is:

1. A vehicle control device comprising:
dual-system control circuits that control power supply to dual-system winding sets of a motor having the winding sets, for each system independently; and
dual-system rotation detection circuits each of which detects a rotation speed of the motor,
the control circuits each being configured to calculate an absolute rotation angle of the motor using the rotation speed of the motor, and each of the control circuits is configured to, when a power source is turned off, store an absolute rotation angle of the motor at that time and, when the power source is turned on, start after confirming that both of the dual-system rotation detection circuits are normal,
wherein at least one of the control circuits is configured to start when the power source is turned on and an absolute value of a difference between an absolute rotation angle of the motor that was stored when the power source was turned off last time and an absolute rotation angle of the motor that is calculated when the power source is turned on this time is equal to or smaller than a given threshold value, regardless of whether it is detected that an abnormality has occurred in one of the dual-system rotation detection circuits or an abnormality of the dual-system rotation detection circuits is not determinable.

2. The vehicle control device according to claim 1, wherein:
the dual-system control circuits are a control circuit of a first system and a control circuit of a second system;
the dual-system rotation detection circuits are a rotation detection circuit of the first system and a rotation detection circuit of the second system;
the control circuit of the first system is configured to provide, to the control circuit of the second system, the rotation speed of the motor detected by the rotation detection circuit of the first system, and receive the rotation speed of the motor detected by the rotation detection circuit of the second system;
the control circuit of the second system is configured to provide, to the control circuit of the first system, the rotation speed of the motor detected by the rotation detection circuit of the second system; and receive the rotation speed of the motor detected by the rotation detection circuit of the first system;
the dual-system control circuits are configured to determine an abnormality of the dual-system rotation detection circuits by comparing the rotation speeds of the motor detected by the dual-system rotation detection circuits; and
the dual-system control circuits have a master-slave relationship, with the control circuit of the first system being a master and the control circuit of the second system being a slave, and a case where an abnormality of the dual-system rotation detection circuits is not determinable is a case where the control circuit of the first system does not start when the power source is turned on.

3. The vehicle control device according to claim 2, wherein:
the motor is a driving source of a mechanical device;
the mechanical device has a sensor that detects an absolute position of a constituent element that operates in conjunction with the motor;
only the control circuit of the first system is connected to the sensor; and
the control circuit of the first system is configured to, when the power source is turned on and it is detected that an abnormality has occurred in one of the dual-system rotation detection circuits or an abnormality of the dual-system rotation detection circuits is not determinable, execute a process of calculating the absolute rotation angle of the motor using the absolute position of the constituent element detected through the sensor, and a process of transmitting the absolute position of the constituent element detected through the sensor to the control circuit of the second system.

4. The vehicle control device according to claim 1, wherein:
the motor is a driving source of a mechanical device;
the mechanical device has a sensor that detects an absolute position of a constituent element that operates in conjunction with the motor;
only a control circuit of a first system of the dual-system control circuits is connected to the sensor; and
the control circuit of the first system is configured to, when the power source is turned on and it is detected that an abnormality has occurred in one of the dual-system rotation detection circuits or an abnormality of the dual-system rotation detection circuits is not determinable, execute a process of calculating the absolute rotation angle of the motor using the absolute position of the constituent element detected through the sensor, and a process of transmitting the absolute position of the constituent element detected through the sensor to a control circuit of a second system of the dual-system control circuits.

5. The vehicle control device according to claim 4, wherein:
the mechanical device is a steering system of a vehicle;
the constituent element is a turning shaft that turns a turning wheel of the vehicle; and
the sensor is a stroke sensor that detects an absolute position of the turning shaft in an axial direction.

6. The vehicle control device according to claim 5, wherein:
the motor is a turning-side motor that generates a turning force for turning the turning wheel of the vehicle; and
the dual-system control circuits include a first turning control circuit that controls power supply to a winding set of a first system of the turning-side motor and a second turning control circuit that controls power supply to a winding set of a second system of the turning-side motor, the winding set of the first system and the winding set of the second system being provided as the dual-system winding sets.

7. The vehicle control device according to claim 5, wherein:
the motor is an assist motor that generates an assistive force for assisting operation of a steering wheel; and
the dual-system control circuits include a first assistance control circuit that controls power supply to a winding set of a first system of the assist motor and a second assistance control circuit that controls power supply to a winding set of a second system of the assistance motor, the winding set of the first system and the winding set of the second system being provided as the dual-system winding sets.

* * * * *